United States Patent [19]

Bresin et al.

[11] Patent Number: 5,180,644

[45] Date of Patent: Jan. 19, 1993

[54] WELDLESS BATTERY PACK

[75] Inventors: Mark S. Bresin, Coral Springs; Adnan Aksoy, Boca Raton; Michael Robinson, Sunrise, all of Fla.

[73] Assignee: Motorola, Inc., Schaumburg, Ill.

[21] Appl. No.: 848,465

[22] Filed: Mar. 9, 1992

[51] Int. Cl.⁵ ............................................. H01M 2/10
[52] U.S. Cl. ..................................... 429/98; 429/99; 429/121; 429/159
[58] Field of Search .................. 429/96-100, 429/1, 9, 159, 121-123; 206/333; 307/150; 439/500

[56] References Cited

U.S. PATENT DOCUMENTS

| | | |
|---|---|---|
| 1,487,428 | 3/1924 | Balderston . |
| 4,593,461 | 6/1986 | Thiele et al. . |
| 5,015,546 | 5/1991 | Dulaney et al. ........................ 429/99 |
| 5,096,788 | 3/1992 | Bresin et al. ........................... 429/99 |
| 5,104,754 | 4/1992 | Dorinski et al. ....................... 429/99 |
| 5,122,927 | 6/1992 | Satou ................................. 429/98 X |

Primary Examiner—Anthony Skapars
Attorney, Agent, or Firm—Pablo Meles

[57] ABSTRACT

A battery pack (10) comprises a housing having two members (2 and 4), a header frame (11), detachably mounted on at least one of the members of the housing, a plurality of cells (12) for insertion into the header frame, a plurality of leaded electronic components (30 and 40) on the header frame, and circuitry (21 and 22) on the header frame for providing intercell connections, battery contacts, charger contacts and for providing weldless circuit connections for the plurality of leaded electronic components.

20 Claims, 2 Drawing Sheets

WELDLESS BATTERY PACK

TECHNICAL FIELD

This invention relates generally to battery cell packs, and more specifically to weldless battery packs.

BACKGROUND

Battery packs for portable devices such as two-way radios typically comprise a number of cells having contacts welded together all within a housing. The individual cells are interconnected using sheet metal tabs which are spot welded to the cell terminals. Usually, the interconnected cells are then spot welded to a flex circuit and subsequently inserted into a battery housing. This method of manufacture is wrought with inefficient assembly procedures and unnecessary parts and labor resulting in excessive manufacturing expense and compromised reliability.

Consumer loaded batteries for consumer electronics such as cameras, radios, CD players, etc., typically have spring loaded contact on one end and metal contacts coupled to the opposite end of the primary cells. Consumer loaded battery packs do not require the extra circuitry typically found in battery packs. Battery packs for portable radios will usually include resistors, thermistors, diodes and other components that enable the battery packs to be rechargeable and/or instrinsically safe. Thus, consumer loaded battery compartments may only have stamped metal on the housing and electrical loss between battery cells and circuitry is of little concern in these applications.

Other battery packs, which are either consumer loaded or loaded and sealed by the manufacturer typically comprise a number of cells that are shrink wrapped together. Again, many of these cells are typically coupled together electronically by welding steel tabs to unlike terminals (positive and negative) on separate cells. Subsequently, the welded cells are shrink wrapped together and inserted into a housing. Again, this assembly procedure is inefficient, resulting in excessive labor and manufacturing costs. Therefore, a need exists for a battery pack that provides the convenience of consumer loaded battery packs and allows for greater efficiency and reduced cost in assembly and manufacture.

SUMMARY OF THE INVENTION

Accordingly, a battery pack comprises a housing, a header frame, detachably mounted to the housing, a plurality of cells for insertion into the header frame, and circuitry on the header for coupling the plurality of cells and providing charger and power contacts.

DETAILED DESCRIPTION OF THE PREFERRED EMBODIMENT

Figure 1:
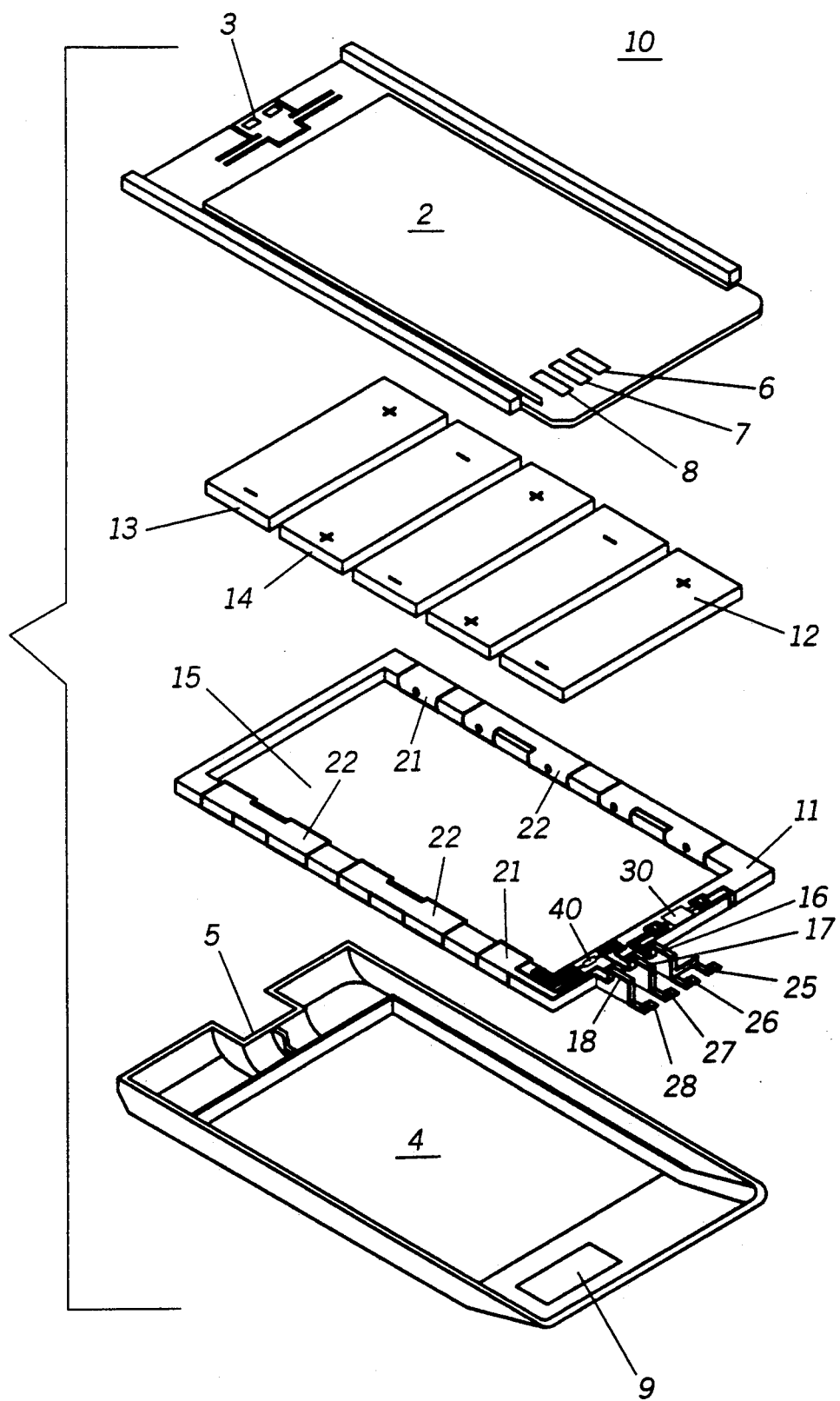
FIG. 1 is a perspective view of a battery pack in accordance with the present invention.

Referring to FIG. 1, there is shown perspective view of a battery pack 10 in accordance with the present invention. The battery pack 10 preferably comprises a housing having a top portion 2 and a bottom portion 4. The housing portions are preferably constructed to snap together. Alternatively, the housing portions could be ultrasonically welded together. The housing members also preferably include a latch feature 3 and a recessed area 5 to allow the detachable coupling of the battery pack 10 to radio (not shown). Within the housing portions 2 and 4, lies a header frame 11 being detachably mounted into at least one of the housing portions. The header frame 11 preferably snaps into the bottom member 4.

The header frame 11, itself, comprises circuitry means for coupling a plurality of cells 12 and for providing charger contacts (25, 26, 27, and 28) and power contacts (16, 17, and 18) to a portable electronic product. On the header frame 11, a plurality of stamped out metal spring contacts 21 and 22 are used to interconnect the cells 12 in series from negative terminals 13 to positive terminals 14 on the individual cells 12. Alternatively, the contacts 21 and 22 could be configured to interconnected the cells in parallel. Additionally, the header frame 11 could carry and interconnect other leaded discrete devices which are typically used in a rechargeable battery pack for safety and/or Factory Mutual approval. The interconnections for the leaded components are preferably force-fit or press fit connections not requiring soldering or welding. For instance, the header frame 11 shown carries a polyswitch 30, preferably made by RAYCHEM, and a thermistor 40. Of course, other leaded components for placement on the header are within contemplation of the present invention.

Figure 2:
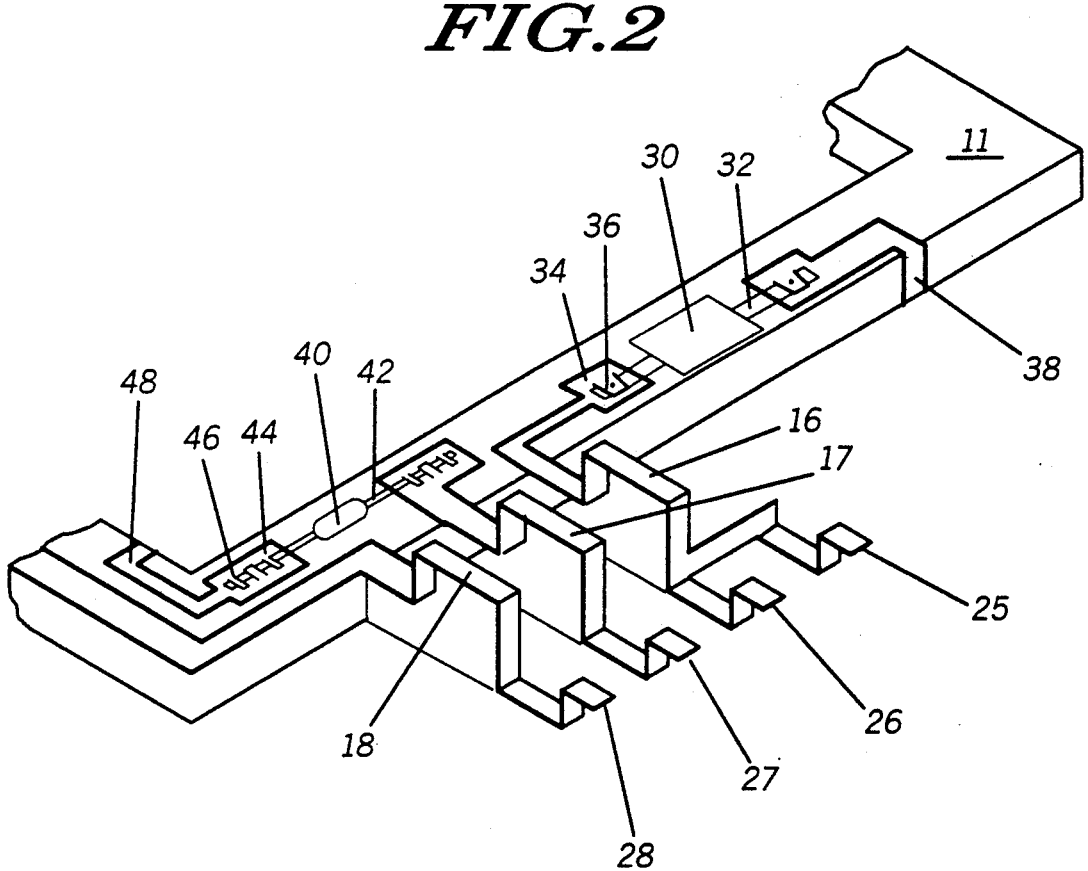
FIG. 2 is a partial perspective view a header frame in accordance with the present invention.

Referring to FIG. 2, the round leaded components such as the thermistor 40 are preferably connected using a solderless connector 44 having three leaf springs 46. The two outer leaf springs prevents the lead 42 from moving in one direction, while the center leaf spring prevents the lead 42 from moving in the opposing direction. The connector 44 is preferably integrally coupled to a circuit runner 48 which connects to a cell terminal. Likewise, the flat leaded components such as the polyswitch 30 having a flat lead 32 is preferably connected using another solderless connector 34 having at least one leaf spring. The flat lead 32 could be press fitted between the leaf spring 36 and the header frame 11. The connector 34 is preferably integrally coupled to circuit runners (38) to allow connections between the polyswitch and other circuits or cell as desired. The runners 38 could run along the bottom surface of the header frame to the desired location.

In another embodiment of the present invention, the circuitry means could be disposed on the surface of the header frame 11 using molded-in spring fingers being biased toward the positive (14) and negative (13) terminals of the cells 12 to provide interconnections between the plurality of cells as is disclosed in U.S. Pat. No. 5,104,754 filed by the Applicant and hereby incorporated by reference. The spring fingers preferably include other metallization layers to insure sufficient contact force with the terminals of the cells to be inserted between the dimensions of the header frame 11. The molded-in or integral metallization is preferably made using double-shot molding, but other means of providing interconnections on header frame is within contemplation of the present invention. Furthermore, molded-in circuitry could be used to provide the charger contacts (25, 26, 27, and 28) and power contacts (16, 17, and 18) also as described in U.S. Pat. No. 5,104,754.

The header frame is preferably made of a high temperature thermoplastic such as polyetherimide, polysulfone, polyethersulfone, polyetheretherketone, polycarbonate, polyimide, and blends of these materials. Other thermoplastics and thermosets may be utilized to realize similar results.

In assembly, the battery pack 10 requires no soldering or welding. Preferably, the header frame 11 is positioned or alternatively snapped into a the housing portion 4. Then, the cells 12, preferably parallelepiped shaped prismatic cells, are inserted within the aperture 15 of the header frame 11. The charger contacts (25, 26, 27, and 28) on the header protrude through an aperture 9 in the bottom housing portion 4. The power contacts (16, 17, and 18) also either protrude or are exposed externally via apertures 6, 7, and 8 respectively in the upper housing member 2. Charger contact 28 and power contact 18 is preferably the negative contact. Charger contact 27 and power contact 17 is preferably the thermistor contact coupled to the thermistor 40 used for temperature cutoff during charging. Charger contacts 25 and 26 serve as the positive charger contacts. Power contact 16 preferably serves as the positive contact to a portable electronic product (not shown). Charger contacts 25 and 26 and power contact 16 are connected to a polyswitch 30 which creates a temporary open circuit when the current exceeds a predetermined maximum, thus temporarily disabling the battery for safety precautions. Of course, other components in other combinations with diodes, thermal fuses, thermostats and switches could be used instead of the polyswitch and/or thermistor.

The battery pack 10 can be assembled in approximately the same time a consumer inserts batteries into their consumer electronic products. Additionally, this assembly can easily be adapted for robotic assembly.

What is claimed is:

1. A battery pack, comprising:
   a housing;
   a header frame, detachably mounted to the housing;
   a plurality of cells for insertion into the header frame; and
   circuitry means on the header for coupling the plurality of cells and providing charger and power contacts.

2. The battery pack of claim 1, wherein the circuitry means comprises stamped metal spring contacts mounted on the header frame.

3. The battery pack of claim 1, wherein circuitry means comprises molded in circuitry on the header frame and on spring fingers on the header frame, said spring fingers being biased toward the positive and negative terminals of the cells and providing the interconnection for said plurality of cells.

4. The battery pack of claim 1, wherein the circuitry means further comprises charger contacts for recharging said plurality of cells.

5. The battery pack of claim 1, wherein the circuitry means further comprises battery contacts for providing power to a portable electronic device.

6. The battery pack of claim 1, wherein the circuitry means further comprises battery contacts for providing power to a portable electronic device and charger contacts for recharging said plurality of cells.

7. The battery pack of claim 1, wherein said battery pack couples to a radio.

8. The battery pack of claim 1, wherein said plurality of cells are prismatic cells.

9. The battery pack of claim 1, wherein the header frame is substantially in the form of a rectangle.

10. The battery pack of claim 1, wherein the header frame is made of a thermoplastic selected from a group consisting of polyetherimide, polysulfone, polyethersulfone, polyetheretherketone, polycarbonate, polyimide, and blends of these materials.

11. The battery pack of claim 1, wherein the header frame is made of a thermoset material.

12. The battery pack of claim 1, wherein the circuitry means further comprises a polyswitch.

13. The battery pack of claim 1, wherein the circuitry means further comprises a thermistor.

14. A battery pack, comprising:
   a plurality of cells within a housing, each cell having a positive and negative terminal;
   a header frame detachably mounted within the housing; and
   a circuit disposed on the surface of said header frame including molded in spring fingers, said spring fingers being biased toward said positive and negative terminals and providing at least some interconnection for said plurality of cells.

15. The battery pack of claim 14, wherein the circuit disposed on the header frame further comprises battery contacts for providing power to a detachable electronic device.

16. The battery pack of claim 14, wherein the circuit disposed on the header frame further comprises charger contacts for recharging the plurality of cells.

17. The battery pack of claim 14, wherein the circuit disposed on the header frame further comprises battery contacts for providing power to a portable electronic device and charger contacts for recharging said plurality of cells.

18. A battery pack, comprising:
   a housing having two members;
   a header frame, detachably mounted on at least one of the members of the housing;
   a plurality of cells for insertion into the header frame;
   a plurality of leaded electronic components on the header frame;
   circuitry means on the header frame for providing intercell connections, battery contacts, charger contacts and for providing weldless circuit connections for the plurality of leaded electronic components.

19. The battery pack of claim 18, wherein one of the leaded electronic components comprises a polyswitch.

20. The battery pack of claim 18, wherein one of the leaded electronic components comprises a thermistor.

* * * * *